United States Patent Office 2,927,058

Patented Mar. 1, 1960

2,927,058

METHOD OF PRODUCING ANTISEPSIS BY BETA AMYLOSE TRIIODIDE

Wallace L. Minto, Westwood, N.J., assignor to IBC Research Laboratories, Inc., New York, N.Y., a corporation of New York No Drawing. Application July 12, 1957 Serial No. 671,400

8 Claims. (Cl. 167—70)

The present invention relates to antisepsis and in particular antisepsis which employs beta amylose triiodide.

The most potent antiseptics are usually in and of themselves protoplasmic poisons to the tissues of higher organisms as well as to various types of microorganisms and viruses. Hence as a general rule they are toxic or highly irritating substances to the higher forms of life. The newer class of antibacterial agents, commonly known as antibiotics, having antibacterial effects against only limited types of microorganisms, many bacteria are resistant to their action while most types of viruses are unaffected by such antibiotics. In addition, many persons are highly allergic to some antibiotics. Hence it is a desideratum of long standing to discover or make a truly general spectrum antimicrobial agent which will be non-toxic to higher organisms.

It has been found that beta amylose triiodide is such an agent. It was previously known that beta amylose triiodide is substantially non-toxic and non-irritating to the differentiated cells of the higher organisms. Within the scope of the present invention it was determined that the same substance, while non-toxic and non-irritating to the tissues of higher plants and animals was nevertheless a very potent protoplasmic poison to the undifferentiated cells of lower forms of life, such as bacteria, protozoa and viruses. The compound is distinct in its effect from free iodine, having a higher phenol coefficient than iodine and differing in physiological effect. For instance, it may be applied or orally administered to persons who exhibit severe allergies to iodine or other iodides employed as medicaments without eliciting any allergic reactions.

The compound's great germicidal potency is illustrated by the following table:

*Table 1*

| Germicide | Phenol coefficient vs.— | |
|---|---|---|
| | *Micrococcus aureus* | *Salmonella typhosa* |
| Beta amylose triiodide | 12.5 | 8.3 |
| U.S.P. 3% tincture of iodine | 6.3 | 5.8 |
| 5% Lugol's iodine solution | 5.1 | 5.0 |
| Dakin's Solution | | 0.78 |
| Lysol (phenol-cresol solution) | 3.2 | 5.0 |
| Mercurochrome (mercurofluorescein) | 1.7 | |
| Formalin | 0.3 | 0.7 |

The antiseptics listed in Table 1 are representative of the most potent sterilizing substances commonly employed. Unfortunately with the exception of beta amylose triiodide they are toxic to the higher animal and plant forms as well as to germs and hence must be used in dilutions or under circumstances which impair their germicidal activity. It is notable that their germicidal activity is nevertheless less than that of beta amylose triiodide.

An additional measure of the antiseptic action of the compound may be obtained from Table 2, wherein the killing power of beta amylose triiodide against the organisms listed is displayed against incubation time of the cultures employed, dilution of the 5% solution of beta amylose triiodide employed, and the time of contact between the compound and the culture, done in accordance with Reddish Methods of Testing Antiseptics (Reddish, "Antiseptics, Disinfectants, Fungicides and Sterilization," p. 90).

*Table 2*

| Dilution Organism | Time (hrs.) | Minutes | | | | | | | |
|---|---|---|---|---|---|---|---|---|---|
| | | 1:250 .5125 | 1:750 .5125 | 1:500 .5125 | 1:1000 .5125 | 1:1500 .5125 | 1:2000 .5125 | 1:2500 .5125 | 1:3200 .5125 |
| *Clostridium sporogenes* | 24 | + − − − | | | | | | | |
| | 48 | + − − − | | | | | | | |
| *Lactobacillus acidophilus* | 24 | | − − − − | | + + + + | | | | |
| | 48 | | − − − − | | + + + + | | | | |
| *Streptococcus mitis* | 24 | | | − − − − | + + + + | | | | |
| | 48 | | | − − − − | + + + + | | | | |
| *Streptococcus pyogenes* | 24 | | | − − − − | − − − − | | | | |
| | 48 | | | − − − − | + + + + | | | | |
| *Escherichia coli* | 24 | | | | − − − − | + + + − | + + + + | | |
| | 48 | | | | − − − − | + + + − | + + + + | | |
| *Salmonella enteritidis* | 24 | | | | | | − − − − | + + + + | |
| | 48 | | | | | | − − − − | + + + + | |
| *Streptococcus faecalis* | 24 | | | | | | | − − − − | |
| | 48 | | | | | | | − − − − | |
| *Shigella dysenteriae* | 24 | | | | | | | | − − − − |
| | 48 | | | | | | | | − − − − |

Note: + = growth; − = no growth.

The media for the organisms were as follows:

*C. sporogenes*—liver infusion media
*L. acidophilus*—tomato juice media
*S. mitis, S. pyogenes*—AC medium
*E. coli, S. enteritidis, S, faecalis, S. dysenteriae*—nutrient broth It is evident that beta amylose triiodide has a complete antibacterial spectrum, being effective against both gram-positive and gram-negative bacteria, against aerobic and anaerobic bacteria encapsulated bacteria, and even against bacterial spores.

The contrast is striking between the compound's deadly effect upon lower organisms and its relative compatibility with the tissues of higher organisms.

Initial acute single dose toxicity studies demonstrated that in rats and guinea pigs, ingestion of doses as high as 2500 mg. per kilogram of body weight failed to elicit toxic symptoms. $LD_{50}$ tests on mice, employing intravenous injection of a 5% aqueous solution of beta amylose triiodide resulted in a figure of 0.3 gram of beta amylose triiodide per kilogram of body weight. Similar intramuscular tests on mice gave a figure of 1.55 grams of beta amylose triiodide per kilogram of body weight.

As regards intraperitoneal injection, when a 5% water solution of beta amylose triiodide is injected directly into the abdominal cavity, toxicity can be demonstrated at high dosage levels. The median lethal dose for rats is about 1500 mg. per kilogram of body weight. For the most susceptible animal, rabbits, the MLD is about 200 mg. per kilogram, while for guinea pigs, it is about 1700 mg./kg.

The skin and mucous membrane of higher animals are relatively insensitive to the compound. Standard rabbit eye tests show that a 5% solution of beta amylose triiodide produces only a slight transient irritation when instilled directly in the eye. A series of scratch and patch tests carried out on humans showed no irritation or reactions, while "repeated insult" tests on humans (including some allergic to iodine) showed no production of an allergy.

Chronic oral toxicity tests on humans involving doses of several grams per day administered over periods of several months showed no symptoms of toxicity or production of an allergic response, even though several of the patients were already allergic to other iodine compounds.

As a broad spectrum antiseptic its uses are legion. Beta amylose triiodide is of value in the antisepsis of burns and open wounds. The absence of a burning or toxic effect upon the tissues minimizes damage thereto thus promoting more rapid healing and knitting and minimizing additional shock to the injured person.

The germicidal non-irritant effect of beta amylose triiodide makes it of value for application to mucous membranes, such as those of the mouth, throat, naso-pharyngeal passages, vagina, urethra, colon and other sensitive tissues of the body for the treatment or prevention of disease.

The non-irritant properties of beta amylose triiodide are also of value for the antisepsis of surgical incisions or of internal organs or tissues exposed during surgery, as well as the preoperative preparation of the surgical field and the antisepsis of the surgeon's hands. Similarly, its germicidal potency and non-irritancy make it of value in the irrigation or lavage of body cavities, deep cuts, puncture wounds or wounds engendered by high-velocity missiles.

Because of its non-irritant and non-allergenic properties, areas to which beta amylose triiodide has been applied may be bandaged, dressed, encased in casts or otherwise covered without danger of subsequent additional irritation or injury to the tissues involved.

The high potency of beta amylose triiodide as a germicide and viricide, coupled with its very low order of toxicity to higher organisms, indicates a value as a wide spectrum systemic antiseptic for the treatment of diseases caused by micro-organisms or viruses which are resistant to control by antibiotics or any chemotherapeutic agents now known or employed.

Other advantages of beta amylose triiodide as an antiseptic derive from its favorable physical and chemical properties. It may be prepared, stored and shipped as a dry powder. It is stable for greatly extended periods of time over all known climatic temperature ranges. It is readily soluble and stable in water and aqueous solution and physiological fluids. It is unaffected by acidity or alkalinity over the entire range of pH met with in physiological fluids.

Because of its wide physical adaptability and safety, beta amylose triiodide may be administered in a great many forms and by a number of routes. For treatment of infective diseases of the stomach or digestive tract, beta amylose triiodide may be orally administered as a solution or as tablets, with or without an enteric coating. It may be administered for a great variety of active diseases as an insufflation of the dry powder, or by subcutaneous, subdermal or intravenous injection or by injection into any organ or cavity of the body in the form of solutions of the beta amylose triiodide in fluids or suspensions of beta amylose triiodide in oils or other fluids in which it is not appreciably soluble.

Numerous other examples of valuable applications of a substance which combines high bactericidal and viricidal potency with extremely low toxicity and irritancy to higher organisms could be cited and are obvious to those skilled in the art.

Although most of the above examples are drawn from uses in the therapy of infective human diseases, similar antiseptic uses of beta amylose triiodide for the treatment of diseases of animals and poultry caused by viruses or bacteria will be obvious to those skilled in the veterinary art.

Since beta amylose triiodide has a low toxicity and low irritancy to the tissues of higher plants, its use is also of advantage in the prevention or treatment of plant diseases caused by viruses, bacteria or other simple forms of life. Numerous applications of beta amylose triiodide in this field are also obvious to those skilled in the art.

Preliminary studies indicate that maintaining a blood level in humans of .01% of the compound is effective for most bacterial and viral organisms. In low concentrations the "half life" of the substance in the blood is about three days, the other half being either excreted or metabolized within the period.

Beta amylose triiodide may be directly tableted without the use of any fillers or other excipients. However, for best results, a lubricating agent such as magnesium or calcium stearate (1%) may be incorporated in order to facilitate the removal of the tablets from the dies. A median dose would comprise .33 gram of beta amylose triiodide. Three or four of such tablets could be taken each day.

Tablets may be conveniently made up to contain 250 mg. of beta amylose triiodide (⅜ inch diameter tablets), and to combat most organisms three to four of these may be taken each day. For the more resistant organisms the dosage may be safely increased since studies have indicated that the safe dose is .15 gram of beta amylose triiodide per kilogram of body weight.

A 2% solution of beta amylose triiodide in sterile distilled water may be made up. Median dosages for either intravenous or intramuscular injection are .33 gram. Such dosages may be considerably increased where resistant organisms are met.

The .01% desired blood level of beta amylose triiodide may be rapidly obtained with safety by administration of the compound in any of the three forms mentioned.

Another unique advantage of beta amylose triiodide as an antiseptic stems from the fact that it is a highly colored compound, while the products of its reaction with micro-organisms or bacteria-protecting colloids are substantially colorless. Hence it possesses an auto indicator effect which is lacking in other antiseptics. For instance, tincture of iodine does not impart a distinctive color to dilute solutions and the products of its reaction with bacteria are also brown. The brown color of iodine or its antiseptic reaction products is not readily distinguished from the coloration found in many water sources and most physiological fluids. On the other hand, as little as ten parts per million of unreacted beta amylose triiodide imparts a distinctive blue coloration to a fluid. There are various dyes of great tinctorial ability which are sometimes used as antiseptics, such as mercuro-fluorescein or crystal violet, but the color of their reaction products with bacteria does not materially differ from that of the original compound.

Beta amylose triiodide is unique in providing a distinctive visual signal upon completion of antisepsis. There are numerous practical advantages inherent in this unique characteristic which the following illustrations exemplify.

In the irrigation of wounds or body cavities, if the flow of beta amylose triiodide solution is continued until the effluent liquid exhibits the distinct typical coloration of beta amylose triiodide, the antisepsis of the irrigated area is then known to have reached an effective level. The disadvantages of both under-dosing and over-dosing are thus eliminated.

In the field disinfection of potable water, the concentration of bacteria and bacteria-protecting colloids varies widely depending upon the source of raw water. If beta amylose triiodide is added to the water until the typical coloration becomes evident, its safety for consumption is assured, no matter how highly contaminated the source.

The same characteristic is also of value for the rapid laboratory or field evaluation of a potential water supply by titration of a sample with a standardized beta amylose triiodide solution.

The coloration of a solution is also an evident aid in maintaining an effective antiseptic concentration in the wash or rinse water used for glassware, dishes or utensils in restaurants or other institutions.

It is not desired to be limited except as set forth in the following claims, the above description being by way of illustration of the invention, and what is claimed is:

1. The method of producing antisepsis in a medium which comprises introduction thereto of beta amylose triiodide.

2. The method of producing asepsis in a medium containing bacterial and virus organisms which comprises introducing into said medium a non-toxic amount of beta amylose triiodide.

3. A method for inhibiting growth of bacterial and virus organisms in an aqueous system which comprises adding to said system beta amylose triiodide.

4. The method of controlling the growth of substantially undifferentiated plant and animal microorganisms which comprises introducing into the environment of such organisms beta amylose triiodide.

5. The method of controlling the growth of substantially undifferentiated microorganisms living in media in and on a highly differentiated host which consists of introducing into such media beta amylose triiodide.

6. The method of maintaining asepsis in an aqueous medium which includes introducing therein beta amylose triiodide.

7. The method of producing antisepsis in a medium which consists of adding thereto beta amylose triiodide until the distinctive blue coloration of unreacted beta amylose triiodide becomes apparent.

8. The method of determining that a medium has reached the stage of antisepsis which consists of adding thereto beta amylose triiodide until the distinctive blue coloration of unreacted beta amylose triiodide becomes apparent.

References Cited in the file of this patent

UNITED STATES PATENTS

| | | |
|---|---|---|
| 1,493,564 | Quine | May 13, 1924 |
| 1,903,614 | Karns et al. | Apr. 11, 1933 |
| 2,022,729 | Malisoff | Dec. 3, 1935 |
| 2,073,021 | McQuiston | Mar. 9, 1937 |
| 2,383,334 | Minto | Aug. 21, 1945 |
| 2,739,922 | Shelanski | Mar. 27, 1956 |
| 2,759,869 | Sutton et al. | Aug. 21, 1956 |